(12) United States Patent
Liu et al.

(10) Patent No.: US 7,898,443 B2
(45) Date of Patent: Mar. 1, 2011

(54) APPARATUS AND METHODS USING A LINEAR MEMORY MODEL FOR ENCODER OUTPUT BUFFERS

(75) Inventors: Jingyuan Liu, Morris Plains, NJ (US); Bhupinder S. Parhar, Belle Mead, NJ (US); Vikram R. Anreddy, Bridgewater, NJ (US)

(73) Assignee: Qualcomm Incorporated, San Diego, CA (US)

( * ) Notice: Subject to any disclaimer, the term of this patent is extended or adjusted under 35 U.S.C. 154(b) by 130 days.

(21) Appl. No.: 12/328,697

(22) Filed: Dec. 4, 2008

(65) Prior Publication Data

US 2009/0147797 A1 Jun. 11, 2009

Related U.S. Application Data

(60) Provisional application No. 60/992,463, filed on Dec. 5, 2007.

(51) Int. Cl.
*H03M 7/34* (2006.01)
*H03M 7/38* (2006.01)
(52) U.S. Cl. ............................ 341/51; 375/295; 375/316
(58) Field of Classification Search .................... 341/51
See application file for complete search history.

(56) References Cited

U.S. PATENT DOCUMENTS 5,917,438 A * 6/1999 Ando ........................... 341/51
6,577,254 B2 * 6/2003 Rasmussen .................. 341/51
6,667,698 B2 * 12/2003 Apostolopoulos et al. ..... 341/51
2006/0092825 A1 5/2006 Kim et al.

OTHER PUBLICATIONS

International Search Report and Written Opinion - PCT/US2008/085704 - International Search Authority - European Patent Office, Jun. 12, 2009.
Joo Y-M et al., "Doubling Memory Bandwidth for Network Buffers," INFOCOM '98. Seventeenth Annual Joint Conference of the IEEE Computer and Communications Societies. Proceedings. IEEE San Francisco, CA, USA Mar. 29, 1998, New York, NY, USA, IEEE, vol. 2, pp. 808-815.
Sarwate D V ED- Anonymous, "Buffering and Interleaving in Coded Communication Systems," Information Theory, 2008. ISIT 2008. IEEE International Symposium on, IEEE, Piscataway, NJ, USA, Jul. 6, 2008, pp. 2151-2155.

\* cited by examiner

*Primary Examiner*—Khai M Nguyen
(74) *Attorney, Agent, or Firm*—Stanton Braden (57) ABSTRACT

Apparatus and methods for using a linear memory model for encoder output buffering are disclosed. The apparatus and method effect linear memory output buffering by dividing an encoder operation having N sequential frames to be encoded by an encoder into N encoder operations each designated for a single frame transmission, such as in the case of extended frame transmissions having multiple frames. Bits of the N encoder operations are then sequentially buffered in an encoder output buffer, wherein bits of each buffered encoder operation of the N encoder operations are read out of the buffer to a multiplexer engine while bits of a next encoder operation of the N encoder operations is being stored in the encoder output buffer.

45 Claims, 6 Drawing Sheets

APPARATUS AND METHODS USING A LINEAR MEMORY MODEL FOR ENCODER OUTPUT BUFFERS

CLAIM OF PRIORITY UNDER 35 U.S.C. §119

The present Application for Patent claims priority to Provisional Application No. 60/992,463 entitled "LINEAR MEMORY MODEL FOR THE UMB FLDCH ENCODER OUTPUT BUFFERS" filed Dec. 5, 2007, and assigned to the assignee hereof and hereby expressly incorporated by reference herein.

BACKGROUND

1. Field

The present disclosure generally relates to apparatus and methods using a linear memory model for encoder output buffers and, more particularly, to utilizing a linear or sequential memory model in a control channel encoder output buffer handling extended frame transmissions to reduce complexity of the encoder output memory design.

2. Background

In some wireless communication systems, media access control (MAC) layer packets to be transmitted over a wireless network are first split into subpackets. The subpackets are fed into an encoder to be encoded, interleaved and repeated. The output bit stream for each subpacket, called a codeword, may be up to 5 times longer than the subpacket. The codeword is then transmitted across multiple Hybrid Automatic Repeated Request (HARQ) transmissions with repetition if necessary. The HARQ transmissions are, in general, separated by a length of time. For example, in HARQ8, the codeword is transmitted once every 8 frames. For each transmitted frame, only partial bits of entire codeword are transmitted.

In conventional designs, an entire encoded codeword or operation is stored in an encoder memory or buffer. This design requires that the total memory be at least 5 times the sum of length of all incoming MAC packets. For example in the forward link dedicated channel (FLDCH) transmission for Ultra Mobile Broadband (UMB) systems, assuming worst case numbers (e.g., the highest packet format for all the tiles (128), 4 layers and an HARQ interlace depth of 8 frames), the conventional design requires around 25 Mbit of on-chip memory.

In a proposed solution to reduce memory size, an entire codeword is not store, but rather the encoder is run again to regenerate the entire codeword and save only the bits required for a particular HARQ frame transmission. Thus, even though the encoder reruns for all HARQ transmissions, it does not increase the peak million of instructions per second (MIPS) budget of the encoder, and is flexible to handle any number of HARQ transmissions.

An output of the encoder is used by a multiplexer (mux) engine to paint the channel resources, such as FLDCH resources as an example. The encoder will always provide enough bits for each subpacket. However in the case when a portion of the FLDCH resource is occupied by some other channels, the mux engine might not use all the bits provided for a subpacket. To handle such cases, a set of bit stream state variables for each subpacket is maintained. In particular, the bit stream state variables may be initialized by the encoder at the start of the first frame (i.e., HARQ frame) transmission, and subsequently updated by the mux engine at the end of each transmission. While encoding the data for each transmission, the encoder uses these variables to locate the part of the codeword to be written to memory for each subpacket.

The maintenance of state variables by the mux engine simplifies the design of the encoder because it does not require knowledge of any other channels which overlaps with the FLDCH resource (ex. CQI, Beacon, etc).

It is noted that the encoder in the above design is always working on operations or assignments scheduled for the next frame, while the mux engine is working on the current frame. Thus, in the case when an assignment or operation is spread across contiguous frames, such as in extended frame transmissions, (extended or elongated frames), the encoder will not have up-to-date state variable information from the mux engine. In this case, the encoder may be configured based on an assumption of some worst case numbers for the bit stream state variables, and provides some extra bits for each subpacket. By the time the mux engine gets to the next frame, the bit stream state variables will be updated and used to select only the appropriate bits.

In a particular example of UMB FLDCH extended frame transmission, one FLDCH assignment will transmit three frames in a row. A conventional encoder design is configured to generate three frames worth of encoded bits and save them in the encoder output memory or buffer. However, this scheme results in encoded bits from different assignments or operation having different life span. For example, encoded bits from a non-extended transmission assignment or operation will last only one frame, whereas encoded bits from an extended transmission assignment will last for two or more frames. This disparity in life span of bits stored in the memory results in a great deal of complication for the design and operation of the encoder output memory. Accordingly, an encoder output memory or buffer design that reduces the complexity, while still affording efficient encoder operation

SUMMARY

According to an aspect, a method for use in wireless communication system is disclosed. The method includes dividing an encoder operation for having N sequential frames to be encoded by an encoder into N encoder operations each designated for a single frame transmission. Further, the method includes sequentially buffering bits of each of the N encoder operations in an encoder output buffer, wherein bits of a buffered encoder operation of the N encoder operations are read out of the encoder output buffer to a multiplexer engine while bits of a next encoder operation of the N encoder operations are being stored in the encoder output buffer.

According to another aspect, a transceiver for use in wireless communication system is disclosed. The transceiver includes an encoder output buffer, a multiplexer engine, and an encoder. The encoder is configured to divide an encoder operation for having N sequential frames to be encoded by the encoder into N encoder operations each designated for a single frame transmission. Additionally, the encoder is configured to sequentially buffer bits of the N encoder operations in the encoder output buffer, wherein bits of a buffered encoder operation of the N encoder operations are read out of the encoder output buffer to the multiplexer engine while bits of a next encoder operation of the N encoder operations are being stored in the encoder output buffer.

According to yet another aspect, an apparatus for use in wireless communication system is disclosed where the apparatus includes a processor. The processor is configured to divide an encoder operation for having N sequential frames to be encoded by an encoder into N encoder operations each designated for a single frame transmission. Furthermore, the processor is configured to sequentially buffer bits of each of the N encoder operations in an encoder output buffer, wherein bits of a buffered encoder operation of the N encoder operations are read out of the encoder output buffer to a multiplexer engine while bits of a next encoder operation of the N encoder operations are being stored in the encoder output buffer; and a memory coupled to the processor for storing data.

According to still another aspect, an apparatus for use in wireless communication system is disclosed that includes means for dividing an encoder operation for having N sequential frames to be encoded by an encoder into N encoder operations each designated for a single frame transmission. The apparatus also includes means for sequentially buffering bits of each of the N encoder operations in an encoder output buffer, wherein bits of a buffered encoder operation of the N encoder operations are read out of the encoder output buffer to a multiplexer engine while bits of a next encoder operation of the N encoder operations are being stored in the encoder output buffer.

According to yet one further aspect, a computer program product comprising: computer-readable medium is disclosed. The computer-readable medium includes code for causing a computer to divide an encoder operation for having N sequential frames to be encoded by an encoder into N encoder operations each designated for a single frame transmission. The computer-readable medium further includes code for causing a computer to sequentially buffer bits of each of the N encoder operations in an encoder output buffer, wherein bits of a buffered encoder operation of the N encoder operations are read out of the encoder output buffer to a multiplexer engine while bits of a next encoder operation of the N encoder operations are being stored in the encoder output buffer.

DETAILED DESCRIPTION

It is first noted that the techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDME□, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2) and may include improvements such as Ultra Mobile Broadband (UMB). These various radio technologies and standards are known in the art. For clarity, certain aspects of the techniques are described below for UMB or LTE, and both UMB and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Figure 1:
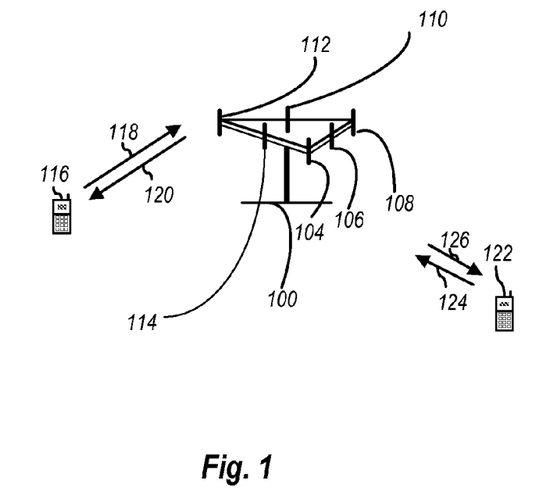
FIG. 1 illustrates a multiple access wireless communication system in which the presently disclosed apparatus and methods may be utilized.

Referring to FIG. 1, an exemplary multiple access wireless communication system is illustrated in which the presently disclosed apparatus and methods may be employed. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over a forward link (FL) 120 and receive information from access terminal 116 over a reverse link (RL) 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 2:
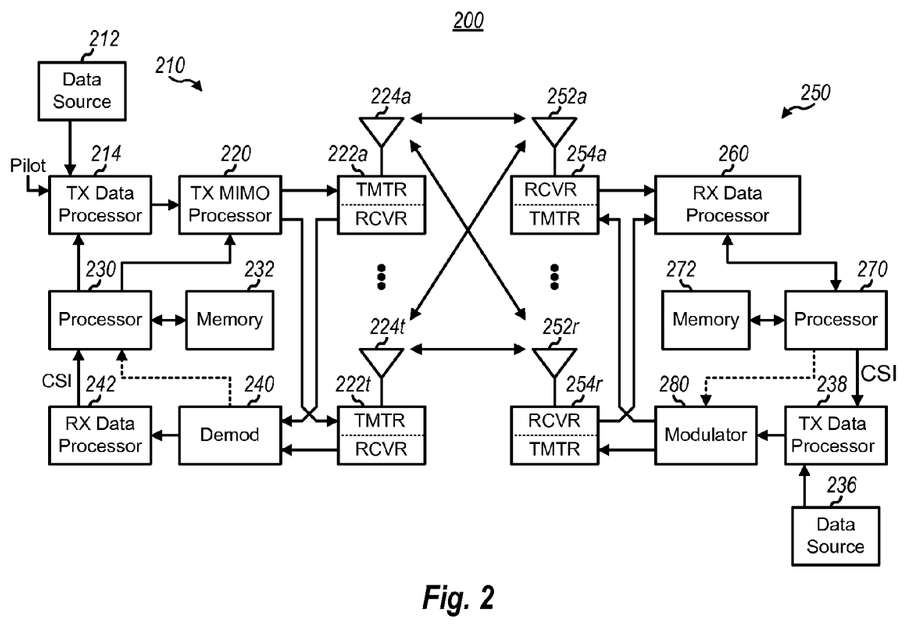
FIG. 2 illustrates an exemplary block diagram of a transmitter system or access point (AP) and a receiver system or access terminal (AT) in which the presently disclosed apparatus and methods may be utilized.

FIG. 2 is a block diagram of an example of a multiple input multiple output (MIMO) system 200 as merely one example of a wireless system in which the disclosed methods and apparatus could be utilized. The system 200 includes a transmitter system 210 (also known as the access point) and a receiver system 250 (also known as access terminal). At the transmitter system 210, traffic data for a number of data streams is provided from a data source 212 to a transmit (TX) data processor 214.

In an aspect, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides NT modulation symbol streams to NT transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. NT modulated signals from transmitters 222a through 222t are then transmitted from NT antennas 224a through 224t, respectively.

At receiver system 250, the transmitted modulated signals are received by NR antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the NR received symbol streams from NR receivers 254 based on a particular receiver processing technique to provide NT "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights then processes the extracted message.

Figure 3:
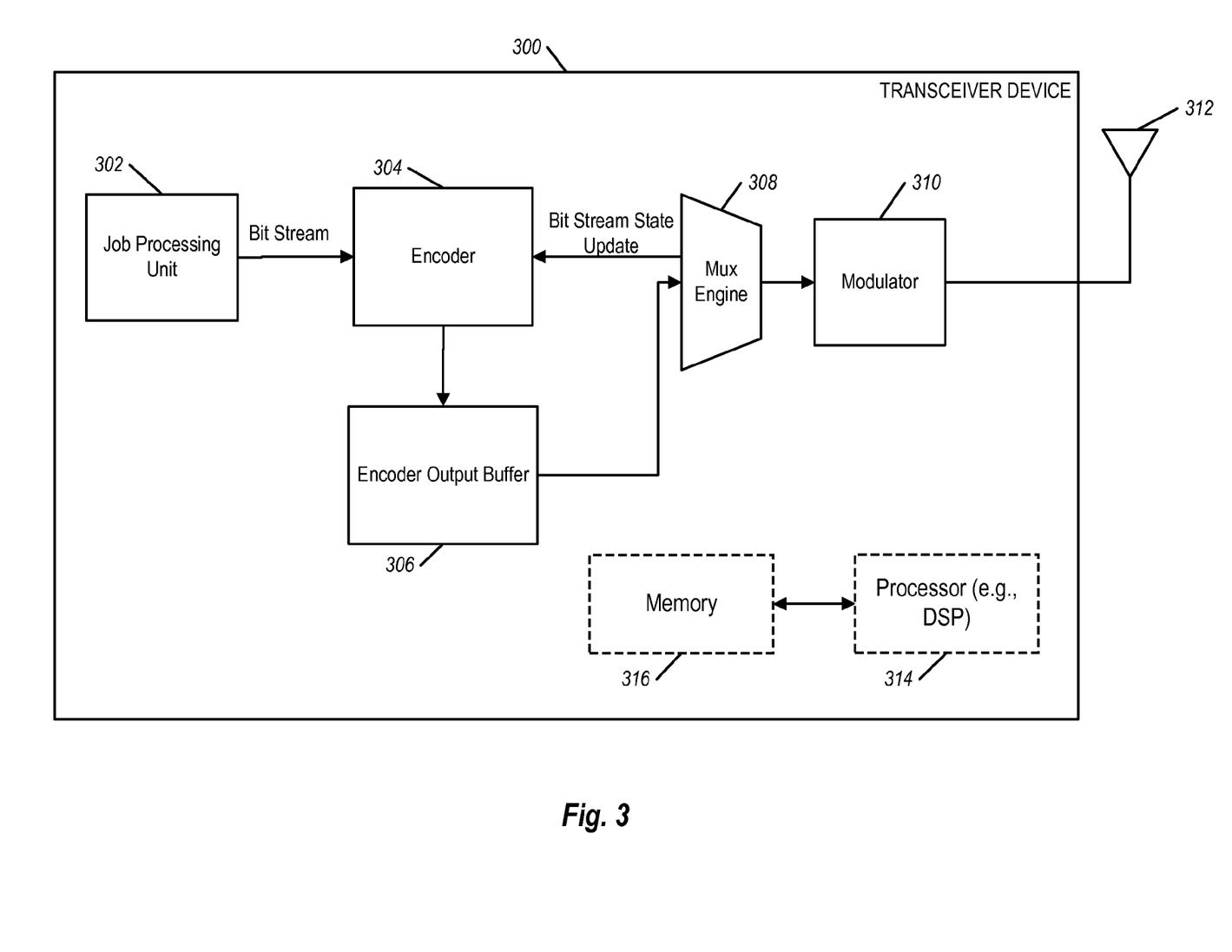
FIG. 3 illustrates an exemplary block diagram of a transceiver in which the present apparatus and methods may be employed

FIG. 3 illustrates an example of a transceiver 300 in which the present apparatus and methods may be employed. Transceiver 300 may be in one aspect implemented as an access point, such as transmitter 210 in FIG. 2. In particular, FIG. 3 illustrates only the transmitter portions of transceiver 300, as the present apparatus and methods relate to encoder operations. Transceiver 300 includes a job processing unit 302, which may implemented by a digital signal processor (DSP) or any other suitable processor device. Unit 302 processes and organizes data to be transmitted by the transceiver 300 and outputs a bit stream to an encoder 304. The job processing unit 302 illustrated may, in one aspect, be configured for organizing FLDCH data for UMB systems. In another example for LTE systems, the processing unit 302 may be configured to process and organize a Physical Downlink Shared Channel (PDSCH).

Encoder 304 encodes the bit stream data using any number of known encoding schemes, such as convolutional or turbo encoding, as merely examples. In an aspect, encoder 304 may be configured to generate and output just enough encoded bits for a next frame transmission rather than entire encoded bits for particular assignments, such as extended frame transmissions. It is noted that a frame is a set number of bits, and that a frame may also contain numerous assignments. As mentioned, for assignments or encoder operations mandating transmission over two or more sequential frames, such as FLDCH extended frame transmission in UMB systems, encoder 304 may be configured to divide the encoder job comprised of an N number of sequential frames (i.e., an extended frame transmission where N is two or greater or multi-frame), into an equal N number of encoder operations equal to the N number of sequential frames. Each of these encoder operations is output to an encoder output buffer or memory 306 for single frame transmission. This division of extended frame transmissions eliminates assignments or encoder operations in the buffer 306 that have different life spans (e.g., some assignments lasting one frame and extended frame transmission assignment lasting more than one frame).

When the encoded bit stream output from encoder 304 is buffered in the encoder output buffer 306, just enough encoded bits are output for a single frame transmission. In an aspect the output buffer 306 is configured according to a linear memory model, where encoded bits for an encoded frame are sequentially buffered or stored in buffer 306. In a particular example, the output buffer 306 may be configured according to a ping-pong linear buffer memory model for encoder output memory since the linear memory model is highly MIPS and memory efficient. A ping-pong linear buffer model means the encoded bits will occupy encoder output buffer sequentially.

Figure 4:
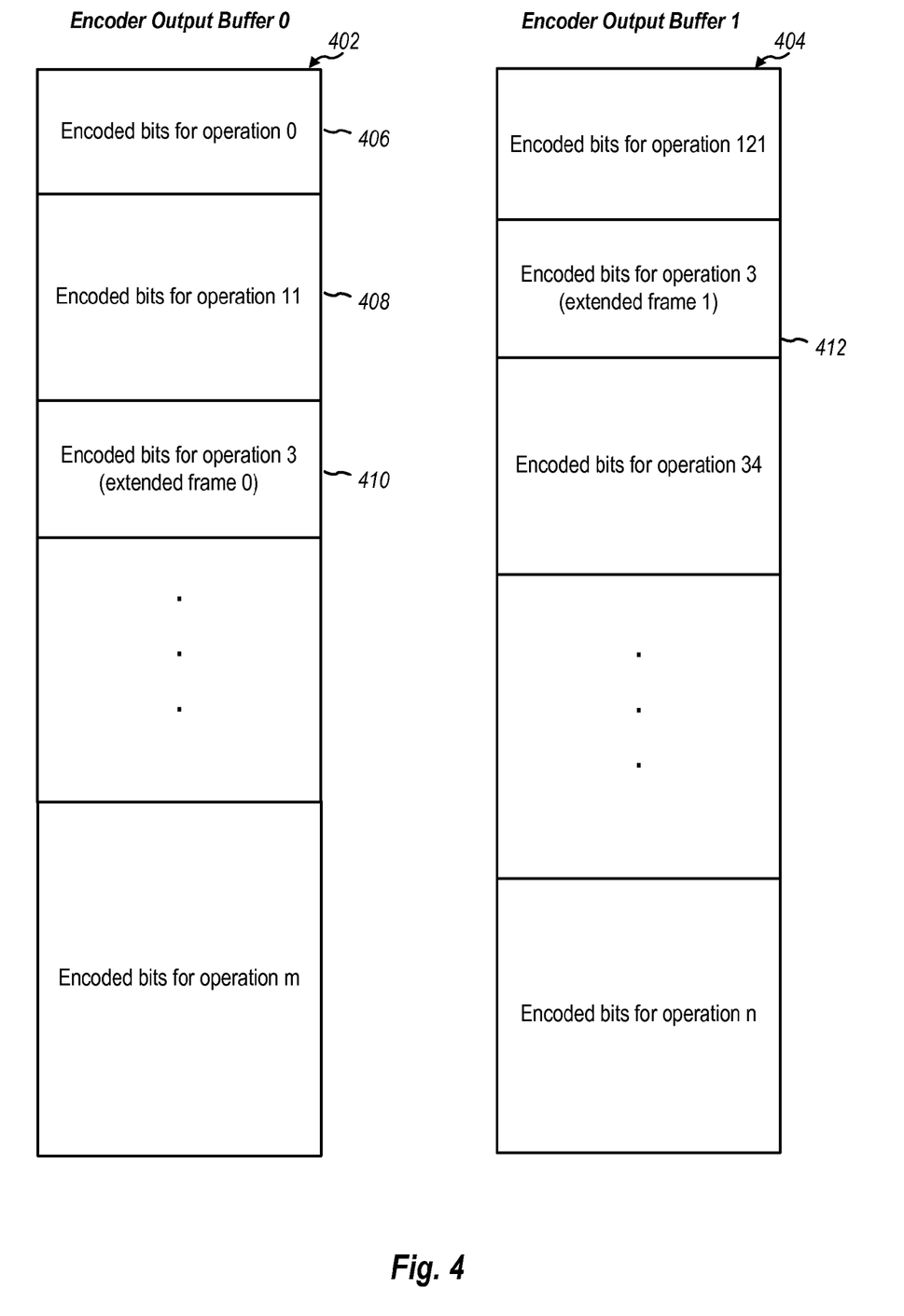
FIG. 4 illustrates an exemplary block diagram configuration of buffer configuration for use in the transceiver of FIG. 3.

As one example of how the output buffer 306 may be configured according to a linear ping pong buffer model, FIG. 4 illustrates an exemplary block diagram configuration of buffer 306. The buffer 306 organized according to a ping pong buffer model includes two organizationally separate buffers 402 and 404, also labeled as Encoder Output Buffer 0 and Encoder Output Buffer 1. The ping-pong linear buffer model, by utilizing two separate buffers, allows overlap of output from one buffer to a multiplexer with encoder processing and storage in the other buffer. That is, data in one buffer is being read out to the multiplexer while the next set of data is read into the other buffer. As may be seen in buffers 402 and 404, various encoded bits for a number of different assignments or operations may be stored for a frame, where each of the buffers 402 and 404, in composite, store the encoded bits for a single transmission frame. Each of the operations or assignments may comprise different numbers of bits, as illustrated by the different block sizes of buffer entries 406, 408, and 410 of buffer 402, as an example.

Concerning the buffering of encoder jobs or operations having multi-frame extended transmission assignments, as discussed before with a linear memory model for buffer 306, encoded bits from different assignments or encoder operations should have the same life span in the buffer. Accordingly, the presently disclosed encoder 304 is configured to divide or break the multi-frame encoder operation having an N number of extended frames into an N number of separate operations. For example, in an encoder operation for a multi-frame extended transmission over three frames, the operation would be divided into three encoder jobs or operations each of one-frame transmission. Accordingly, the encoder 304 would store the first bits encoded in the first of the divided out N encoder job into Encoder Output Buffer 0 (402), as shown by buffer entry 410. This entry 410 is shown for an original extended frame transmission operation "3" of N frames, which has been divided into an N number of separate encoder operations, of which the bits in entry 410 are encoded bits for the first of the divided out N frames (described as extended frame 0 in FIG. 4).

Following the encoding of the first of the N number of separate encoder operations and storage in buffer 402, a next one of the N number of separate encoder operations is then encoded and buffered prior to interleaving by a multiplexer. Continuing with the example above, this next encoder operation of original operation "3" produces encoded bits that are stored in Encoder Output Buffer 1 (404), as illustrated by entry 412 and denoted as extended frame 1 in FIG. 4. It is noted that the size of the entries 410 and 412 are shown identical, which implies that each of N number of separate encoder operations effect encoding of approximately the same number of encoded bits. In an aspect, however, division of the original MAC layer assignment or operation of N frames is based on the number of orthogonal frequency division multiplexed (OFDM) tones allocated to the assignment or operation. Thus, the division may be accomplished by dividing the total number of allocated OFDM tones for an extended frame transmission into approximately equal numbers of allocated tones per frame. As a result, the number of encoded bits stored in the example of entries 410 and 412 of buffers 402 and 404, respectively, will be approximately equal in size.

Referring again to FIG. 3, the transceiver device 300 also includes a multiplexer (termed herein also as a MUX engine) 308, which serves to interleave encoded data read out of the Encoder Output Buffer 306. The encoded and interleaved data is delivered to a modulator 310, operating according to any suitable modulation scheme for wireless RF transmission via antenna 312.

It is noted that the MUX engine 308 is configured to update an encoded bit count or bit stream state at the end of a frame. This context state of the bit stream is sent to encoder 304 in order to allow the encoder to know the status of those bits interleaved and output for transmission. For extended frame transmissions, since the encoder 304 will run encoding operations before the end of a frame, the encoder 304 will not have up-to-date state variable information from the MUX engine 308. In this case, the encoder is configured to assume some worst case numbers for the bit stream state and to provide some extra bits for each divided frame of the original extended frame transmission operation. By the time the MUX engine 308 gets to the next frame in the N number of encoder operations, the bit stream state variables will have been received and updated by encoder 304 and used to select only the appropriate bits for a next frame. It is noted these extra bits generated will not increase encoder output buffer size, in particular, for implementations where the extended frame transmission is targeted only for low packet format in UMB. The presently disclosed methods and apparatus are also applicable to low packet formats in LTE systems, such as with modulation and coding schemes (MCS), as an example.

Figure 5:
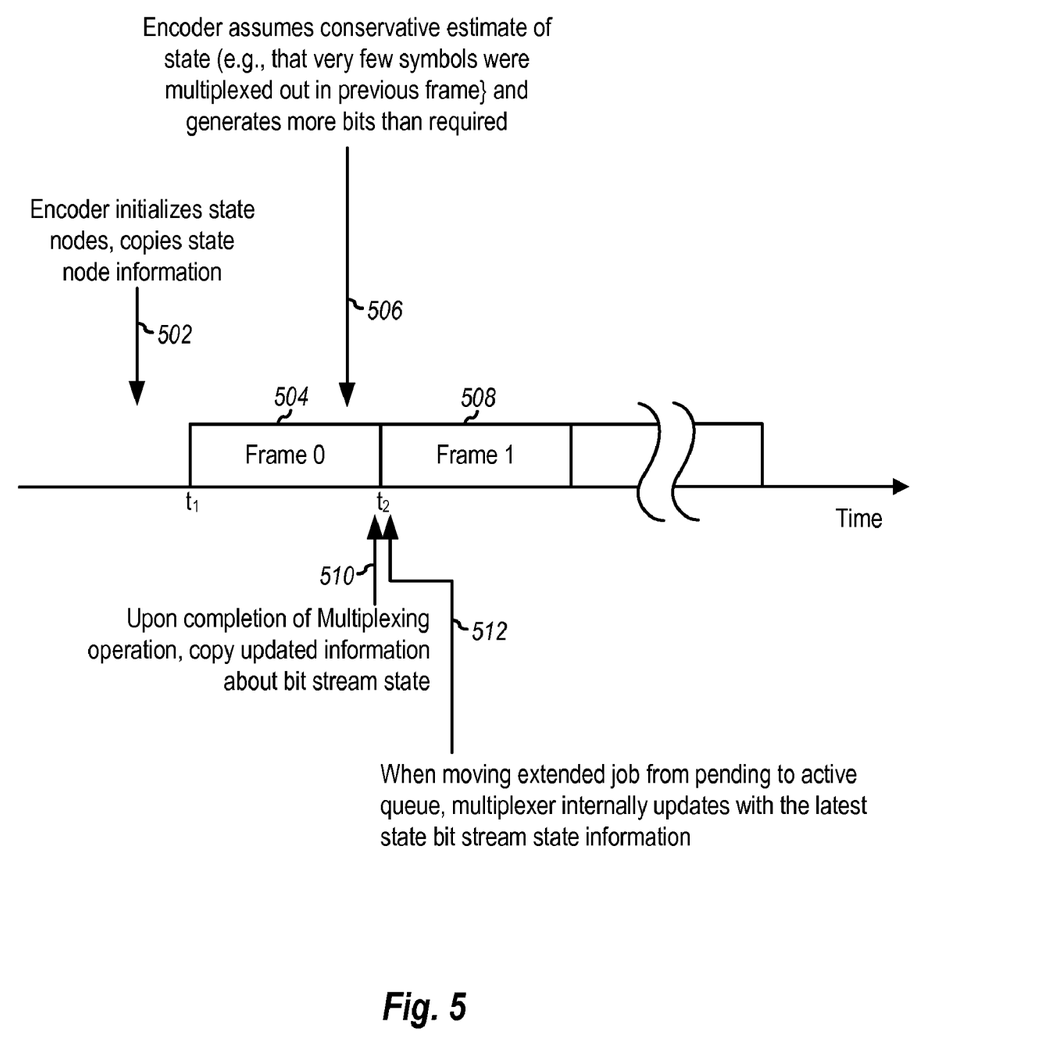
FIG. 5 illustrates a time line of frame encoding, buffering of frames, and multiplexing by the transceiver of FIG. 3.

As an illustration of the timing of the interaction between the encoder 304, output buffer 306, and the MUX engine 308, FIG. 5 illustrates a time line of the frame encoding, buffering of frames, and multiplexing. As illustrated, the encoder 304 is initialized as indicated by arrow 502 to start encoding of a frame; namely Frame 0 in this example and denoted with reference number 504. At initialization, the encoder initializes state nodes, and copies state node information (i.e., the bit stream state variables). The encoder 304 outputs encoded bits to a portion of the buffer 306 (e.g., Encoder Output Buffer 402) for storage. At a time $t_1$ the stored frame 504 is read out to the MUX engine 308 and interleaving of the encoded bits is performed. During the period where the MUX engine is processing the encoded bit from the buffer 306, encoder 304 completes the encoding and storage of the bit for the first frame (Frame 0 504) as indicated by arrow 506. At this time, encoder 304 will begin encoding bits for a next frame, called Frame 1 in this example and denoted with reference number 508. Encoder 304 will not have up-to-date bit stream state information from the MUX engine 308, as the engine 308 has not concluded its processing of frame 0, the conclusion denoted by a time $t_2$. Accordingly, encoder 306 is configured to assume a conservative estimate of the bit stream state for encoding of the subsequent frame; i.e., encoder 306 assumes very few symbols were multiplexed out for the previous frame 0 (504). This conservative estimate, which may be set to a suitable number based on empirical or arbitrary bases, or the particular communication system, will accordingly result in generation of more bits than are necessarily required for the next frame (i.e., frame 1 (508)).

At time $t_2$ the MUX engine 308 will finishing multiplexing frame 0 and then copy updated bit stream state information into a subpacket for transmission as indicated by arrow 510. Additionally at this time the MUX engine 308 may communicate updated bit stream state information to encoder 304 for use in encoding a next encoder operation. Furthermore, a time t2, the MUX engine 308 will begin reading out encoded bits from the other portion of buffer 306 (i.e., Encoder Output Buffer 1 (404)), which becomes the active queue. Any extended frame assignment or operation requires the MUX engine 308 to update the bit stream state internally such that the next of the N sequential frames are properly accorded to the extended frame transmission job, and the corresponding appropriate bits are selected by the MUX engine 308. This operation is indicated by arrow 512. As may be appreciated by those skilled in the art, the time line of FIG. 5 continues with the described operations repeated, as needed, for all subpackets or frames, including extended frame transmissions.

Figure 6:
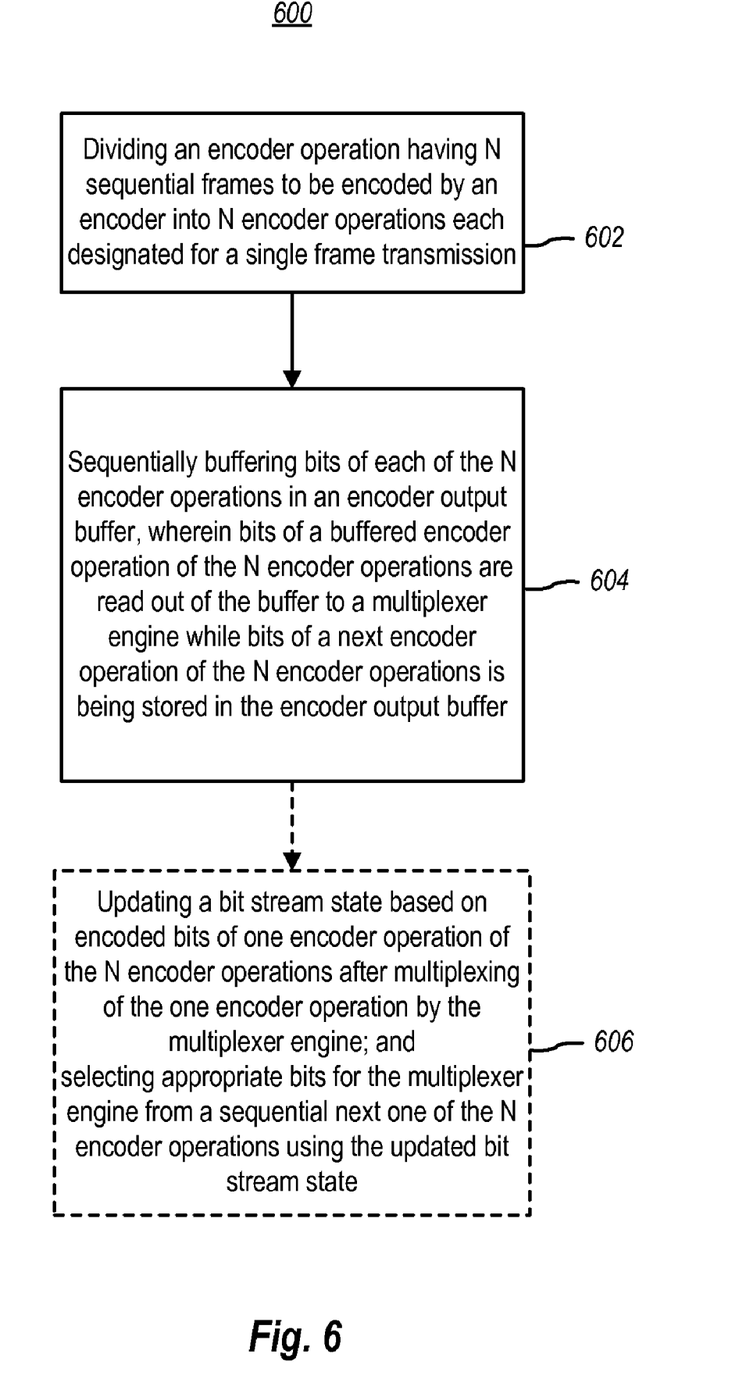
FIG. 6 illustrates a flow chart of a method used in a wireless communication system for encoding and sequentially buffering data according to the present disclosure.

FIG. 6 illustrates a flow chart of a method 600 used in a wireless communication system for encoding and buffering data based on a linear memory model. The method 600 may be implemented, as an example, by various components of transceiver device 300 illustrated in FIG. 3, as well as the transmitters illustrated in either FIG. 1 or 2.

Method 600 begins with dividing an encoder operation having an N number of sequential frames to be encoded by an encoder into N encoder operations each consisting of a single frame transmission as shown in block 602. The process of block 602 may implemented by encoder 304, a DSP or other suitable processor, or a combination thereof. After the division of the encoder operation in block 602, flow proceeds to block 604. Here encoded bits of each of the N encoder operations are sequentially buffered in an encoder output buffer. That is, each of the divided out N number of encoder operations is buffered into the buffer 306 in sequence, where a first of the N operations is encoded into a portion of the linear modeled buffer 306 (e.g., first portion 402), a next operation of the N encoder operations is buffered in buffer 306 (e.g., second portion 404), a still next operation of the N encoder operation buffered in buffer 306 (e.g., now free first portion 402 as bits from the first encoder operation have been read out by the MUX engine 408), and so forth.

As further shown in block 604, bits of a buffered encoder operation of the N encoder operations are read out of the buffer to a multiplexer engine while bits of a next encoder operation of the N encoder operations is being stored in the encoder output buffer. One example of this operation is the ping pong linear buffer model discussed previously. It is noted that the processes of block 604 may be effected by the encoder 304, buffer 306, and MUX engine 308 illustrated in FIG. 3, as an example. Alternatively, various parts of the processes of block 604 could be effected by a processor, such as a DSP or any other suitable processor in combination with a memory storing code or processor instructions. An example of additional processor and memory to implement processes of method 600 are illustrated by alternative processor 314 and memory 316 in FIG. 3.

Method 600 may further include a further process shown in dashed block 606, as these processes are not necessary for practice of the broadest implementation of method 600. As shown by block 606, method 600 may further include updating a bit stream state based on encoded bits of one encoder operation of the N encoder operations after multiplexing of the one encoder operation by the multiplexer engine. Thus, as discussed before, when the MUX engine 408 has completed multiplexing an encoder operation, the bit stream state is updated based on the bits used by the multiplexer 408. Also, it is noted that the processes of block 606 inherently involve performance of the multiplexing operation of the MUX engine, even though not explicitly stated. After updating of the bit stream state, appropriate bits are selected for the multiplexer engine from a sequential next one of the N encoder operations using the updated bit stream state as also shown in block 606.

Figure 7:
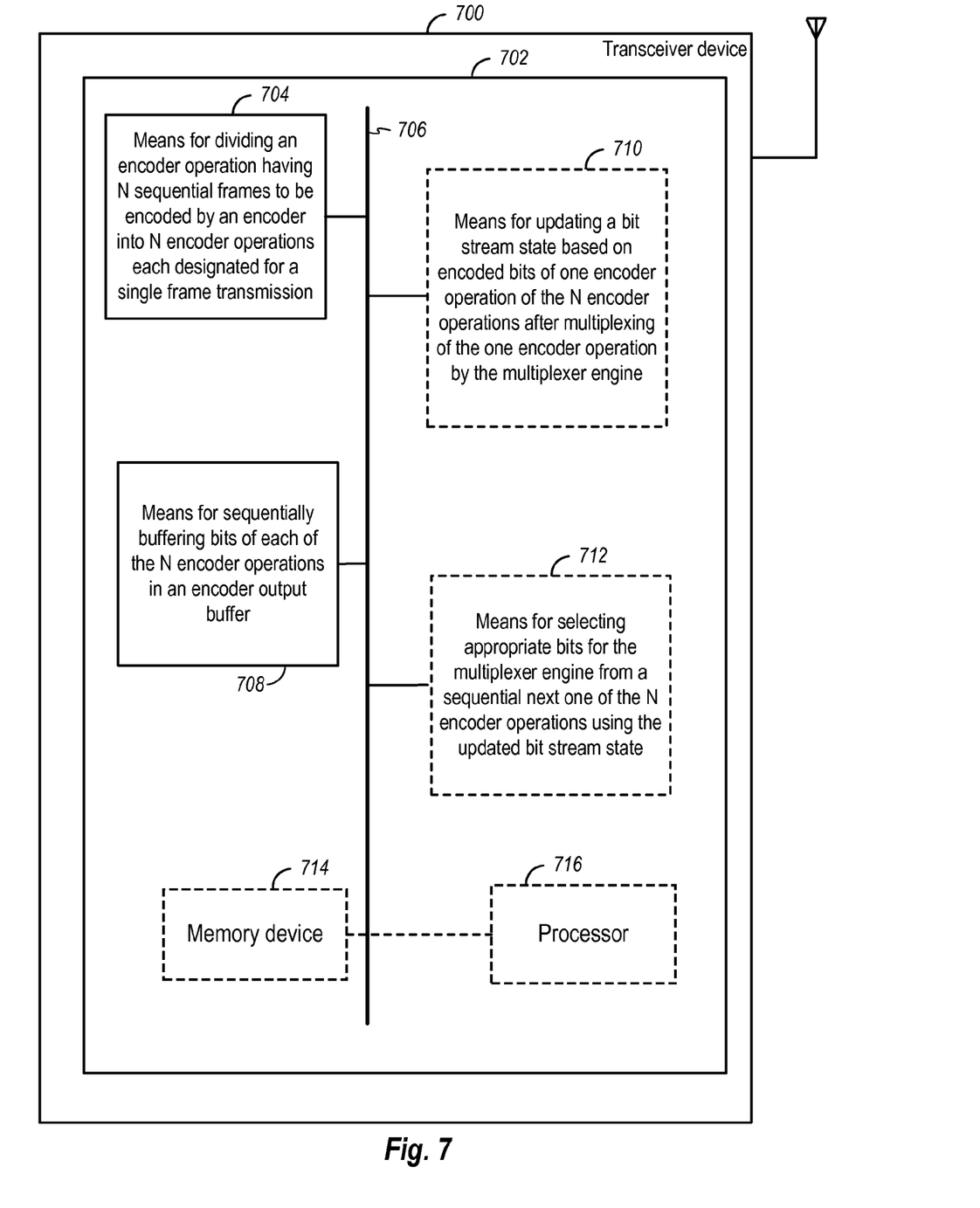
FIG. 7 illustrates a block diagram of another transceiver having apparatus for encoding and buffering data according to the present disclosure.

FIG. 7 illustrates a block diagram of a transceiver device 700 for use in a wireless communication system including an apparatus 702 that may be utilized for encoding operations and linear buffering of bits produced from encoding operations. Apparatus 702 includes a module or means 704 for dividing an encoder operation having N sequential frames to be encoded by an encoder into N encoder operations each designated for a single frame transmission. Means 704 may be implemented by logic or a processor within an encoder, such as encoder 304, job processor 302, another suitable processor such as a DSP, or any combination thereof It is noted that the functionality of means 704 is similar to the functions described above in connection with block 602 in FIG. 6.

The encoded N encoder operations determined by means 704 may then be communicated to various other modules or means in apparatus 702 via a bus 706, or similar suitable communication coupling. In the particular example of FIG. 7, the encoded bits generated by means 704 are communicated via bus 706 to a means 708 for sequentially buffering bits of each of the N encoder operations in an encoder output buffer.

It is noted that, in an aspect, bits of a buffered encoder operation of the N encoder operations are read out of the buffer by means 708 to a multiplexer engine while bits of a next encoder operation of the N encoder operations is being stored in the encoder output buffer by means 708. Means 708 may be implemented, as an example, by one of more of encoder 304, processor 302, buffer 306, or MUX engine 308 from the example of FIG. 3, or also with the assistance of a further DSP or similar processor. It is noted that functionality of means 708 is similar to the functions performed in block 604 of the method of FIG. 6.

Apparatus 702 may further include the option of a means 710 for updating a bit stream state based on encoded bits of one encoder operation of the N encoder operations after multiplexing of the one encoder operation by the multiplexer engine. Means 710 may be implemented, for example, by MUX engine 308, buffer 306, encoder 304, a processor such as a DSP, or any combination thereof. Additionally, it is noted that the functionality of means 710 is similar to processes discussed in connection with block 606 of FIG. 6.

Moreover, apparatus 702 may includes another optional means 712 for selecting appropriate bits for the multiplexer engine from a sequential next one of the N encoder operations using the updated bit stream state. Means 712 may be implemented, for example, by MUX engine 308, buffer 306, encoder 304, a processor such as a DSP, or any combination thereof. Additionally, it is noted that the functionality of means 712 is similar to processes discussed in connection with block 606 of FIG. 6.

Apparatus 702 may also further include an optional computer readable medium or memory device 714 configured to store computer readable instructions and data for effecting the processes and behavior of either the modules. Additionally, apparatus 702 may include a processor 716 to execute the computer readable instructions in memory 714, and may be configured to execute one or more functions of the various modules or means in apparatus 702.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

While, for purposes of simplicity of explanation, the methodology is shown and described as a series or number of acts, it is to be understood that the processes described herein are not limited by the order of acts, as some acts may occur in different orders and/or concurrently with other acts from that shown and described herein. For example, those skilled in the art will appreciate that a methodology could alternatively be represented as a series of interrelated states or events, such as in a state diagram. Moreover, not all illustrated acts may be required to implement a methodology in accordance with the subject methodologies disclosed herein.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary examples, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The examples disclosed herein are provided to enable any person skilled in the art to make or use the presently disclosed subject matter. Various modifications to these disclosed examples will be readily apparent to those skilled in the art, and the generic principles defined herein may be applied to other embodiments without departing from the teachings of the present disclosure. It is also noted that the word "exemplary" is used exclusively herein to mean "serving as an example, instance, or illustration." Any example described herein as "exemplary" is not necessarily to be construed as preferred or advantageous over other examples. Thus, the present disclosure is not intended to be limited to the examples shown herein, but is to be accorded the widest scope consistent with the principles and novel features disclosed herein.

The invention claimed is:

1. A method for use in wireless communication system, the method comprising:
   dividing an encoder operation for having N sequential frames to be encoded by an encoder into N encoder operations each designated for a single frame transmission; and
   sequentially buffering bits of each of the N encoder operations in an encoder output buffer, wherein bits of a buffered encoder operation of the N encoder operations are read out of the encoder output buffer to a multiplexer engine while bits of a next encoder operation of the N encoder operations are being stored in the encoder output buffer.

2. The method as defined in claim 1, further comprising:
   updating a bit stream state based on encoded bits of one encoder operation of the N encoder operations after multiplexing of the one encoder operation by the multiplexer engine; and
   selecting appropriate bits for the multiplexer engine from a sequential next one of the N encoder operations using the updated bit stream state.

3. The method as defined in claim 2, further comprising:
   sending the updated bit stream state to the encoder for a next encoder operation.

4. The method as defined in claim 1, wherein the encoder operation having N frames is a UMB extended frame transmission.

5. The method as defined in claim 1 wherein the encoder output buffer is configured as a ping-pong linear buffer having at least first and second buffer portions.

6. The method as defined in claim 5, wherein the bits of a first buffered encoder operation of the N encoder operations are read out of the one of the first and second buffer portions of the encoder output buffer to the multiplexer engine while bits of a next second sequential encoder operation of the N encoder operations is being stored in the other one of the first and second buffer portions of the encoder output buffer.

7. The method as defined in claim 1, wherein the encoder is a UMB FLDCH encoder.

8. The method as defined in claim 1, wherein the encoder is an LTE PDSCH encoder.

9. The method as defined in claim 1, wherein the encoder operation having N sequential frames is an extended frame transmission.

10. A transceiver for use in wireless communication system, the transceiver comprising:
    an encoder output buffer;
    a multiplexer engine; and
    an encoder configured to:
       divide an encoder operation for having N sequential frames to be encoded by the encoder into N encoder operations each designated for a single frame transmission; and sequentially buffer bits of the N encoder operations in the encoder output buffer, wherein bits of a buffered encoder operation of the N encoder operations are read out of the encoder output buffer to the multiplexer engine while bits of a next encoder operation of the N encoder operations are being stored in the encoder output buffer.

11. The transceiver as defined in claim 10, wherein the multiplexer engine is configured to:
update a bit stream state based on encoded bits of one of the N encoder operations after multiplexing; and
select appropriate bits for the multiplexer engine from a sequential next one of the N encoder operations using the updated bit stream state.

12. The transceiver as defined in claim 11, wherein the multiplexer engine if further configured to send the updated bit stream state to the encoder for a next encoder operation.

13. The transceiver as defined in claim 10, wherein the encoder operation having N frames is a UMB extended frame transmission.

14. The transceiver as defined in claim 10, wherein the encoder output buffer is configured as a ping-pong linear buffer having at least first and second buffer portions.

15. The transceiver as defined in claim 14, wherein the bits of a first buffered encoder operation of the N encoder operations are read out of the one of the first and second buffer portions of the encoder output buffer to the multiplexer engine while bits of a next second sequential encoder operation of the N encoder operations is being stored in the other one of the first and second buffer portions of the encoder output buffer.

16. The transceiver as defined in claim 10, wherein the encoder is a UMB FLDCH encoder.

17. The transceiver as defined in claim 10, wherein the encoder is an LTE PDSCH encoder.

18. The transceiver as defined in claim 10, wherein the encoder operation having N sequential frames is an extended frame transmission.

19. An apparatus for use in wireless communication system comprising:
means for dividing an encoder operation for having N sequential frames to be encoded by an encoder into N encoder operations each designated for a single frame transmission; and
means for sequentially buffering bits of each of the N encoder operations in an encoder output buffer, wherein bits of a buffered encoder operation of the N encoder operations are read out of the encoder output buffer to a multiplexer engine while bits of a next encoder operation of the N encoder operations are being stored in the encoder output buffer.

20. The apparatus as defined in claim 19, further comprising:
means for updating a bit stream state based on encoded bits of one encoder operation of the N encoder operations after multiplexing of the one encoder operation by the multiplexer engine; and
means for selecting appropriate bits for the multiplexer engine from a sequential next one of the N encoder operations using the updated bit stream state.

21. The apparatus as defined in claim 20, further comprising:
means for sending the updated bit stream state to the encoder for a next encoder operation.

22. The apparatus as defined in claim 19, wherein the encoder operation having N frames is a UMB extended frame transmission.

23. The apparatus as defined in claim 19, wherein the encoder output buffer is configured as a ping-pong linear buffer having at least first and second buffer portions.

24. The apparatus as defined in claim 23, wherein the bits of a first buffered encoder operation of the N encoder operations are read out of the one of the first and second buffer portions of the encoder output buffer to the multiplexer engine while bits of a next second sequential encoder operation of the N encoder operations is being stored in the other one of the first and second buffer portions of the encoder output buffer.

25. The apparatus as defined in claim 19, wherein the encoder is a UMB FLDCH encoder.

26. The apparatus as defined in claim 19, wherein the encoder is an LTE PDSCH encoder.

27. The apparatus as defined in claim 19, wherein the encoder operation having N sequential frames is an extended frame transmission.

28. An apparatus for use in wireless communication system, the apparatus comprising:
a processor, configured to:
divide an encoder operation for having N sequential frames to be encoded by an encoder into N encoder operations each designated for a single frame transmission; and
sequentially buffer bits of each of the N encoder operations in an encoder output buffer, wherein bits of a buffered encoder operation of the N encoder operations are read out of the encoder output buffer to a multiplexer engine while bits of a next encoder operation of the N encoder operations are being stored in the encoder output buffer; and
a memory coupled to the processor for storing data.

29. The apparatus as defined in claim 28, wherein the processor is further configured to:
update a bit stream state based on encoded bits of one encoder operation of the N encoder operations after multiplexing of the one encoder operation by the multiplexer engine; and
select appropriate bits for the multiplexer engine from a sequential next one of the N encoder operations using the updated bit stream state.

30. The apparatus as defined in claim 29, wherein the processor is further configured to:
send the updated bit stream state to the encoder for a next encoder operation.

31. The apparatus as defined in claim 28, wherein the encoder operation having N frames is a UMB extended frame transmission.

32. The apparatus as defined in claim 28, wherein the encoder output buffer is configured as a ping-pong linear buffer having at least first and second buffer portions.

33. The apparatus as defined in claim 32, wherein the bits of a first buffered encoder operation of the N encoder operations are read out of the one of the first and second buffer portions of the encoder output buffer to the multiplexer engine while bits of a next second sequential encoder operation of the N encoder operations is being stored in the other one of the first and second buffer portions of the encoder output buffer.

34. The apparatus as defined in claim 28, wherein the encoder is a UMB FLDCH encoder.

35. The apparatus as defined in claim 28, wherein the encoder is an LTE PDSCH encoder.

36. The apparatus as defined in claim 28, wherein the encoder operation having N sequential frames is an extended frame transmission.

37. A computer program product, comprising:
  computer-readable medium comprising:
    code for causing a computer to divide an encoder operation for having N sequential frames to be encoded by an encoder into N encoder operations each designated for a single frame transmission; and
    code for causing a computer to sequentially buffer bits of each of the N encoder operations in an encoder output buffer, wherein bits of a buffered encoder operation of the N encoder operations are read out of the encoder output buffer to a multiplexer engine while bits of a next encoder operation of the N encoder operations are being stored in the encoder output buffer.

38. The computer program product as defined in claim 37, the computer-readable medium further comprising:
  code for causing a computer to update a bit stream state based on encoded bits of one encoder operation of the N encoder operations after multiplexing of the one encoder operation by the multiplexer engine; and
  code for causing a computer to select appropriate bits for the multiplexer engine from a sequential next one of the N encoder operations using the updated bit stream state.

39. The computer program product as defined in claim 38, the computer-readable medium further comprising:
  code for causing a computer to send the updated bit stream state to the encoder for a next encoder operation.

40. The computer program product as defined in claim 37, wherein the encoder operation having N frames is a UMB extended frame transmission.

41. The computer program product as defined in claim 37, wherein the encoder output buffer is configured as a ping-pong linear buffer having at least first and second buffer portions.

42. The computer program product as defined in claim 41, wherein the bits of a first buffered encoder operation of the N encoder operations are read out of the one of the first and second buffer portions of the encoder output buffer to the multiplexer engine while bits of a next second sequential encoder operation of the N encoder operations is being stored in the other one of the first and second buffer portions of the encoder output buffer.

43. The computer program product as defined in claim 37, wherein the encoder is a UMB FLDCH encoder.

44. The computer program product as defined in claim 37, wherein the encoder is an LTE PDSCH encoder.

45. The computer program product as defined in claim 37, wherein the encoder operation having N sequential frames is an extended frame transmission.

\* \* \* \* \*